UNITED STATES PATENT OFFICE.

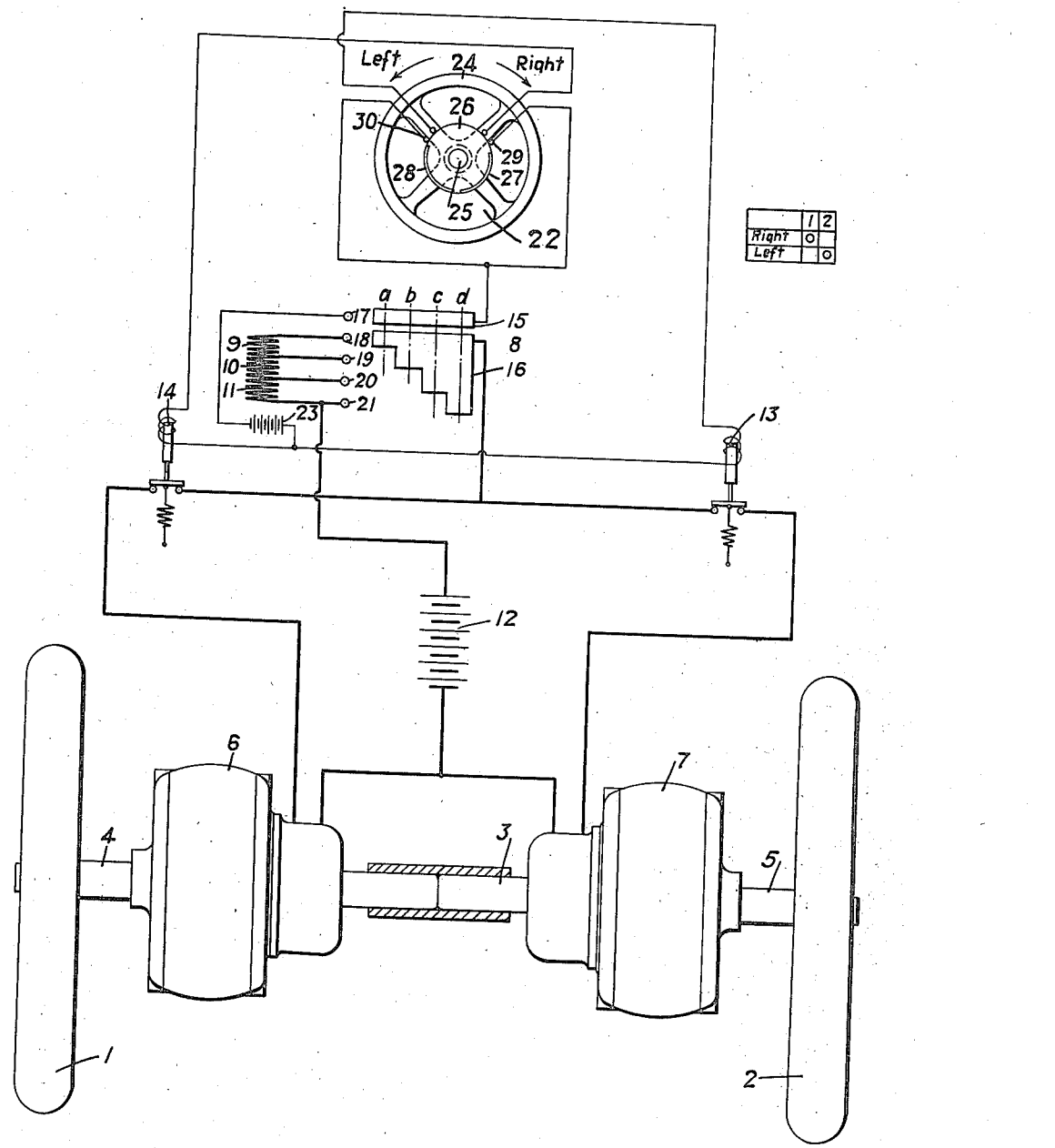

REESE T. KINTZING, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,283,211.  Specification of Letters Patent.  Patented Oct. 29, 1918.

Application filed December 2, 1915. Serial No. 64,652.

*To all whom it may concern:*

Be it known that I, REESE T. KINTZING, a citizen of the United States, and a resident of Wilkinsburg, in the county of Allegheny and State of Pennsylvania, have invented a new and useful Improvement in Control Systems, of which the following is a specification.

My invention relates to control systems for electric vehicles and particularly to control systems for electrically operated automobiles.

One object of my invention is to provide an automobile with a control system which will eliminate the differential gears now in general use on automobiles.

A further object of my invention is to provide a control system of the above indicated class with a master controller through which all the main and auxiliary circuits must pass, so that, with the controller in the off position, no circuit in the control system can be closed.

In automobiles of common use, the rear axle must be provided with a differential gear in order that the driving power may be correctly proportioned between the two driving wheels when the car is turning to the right or to the left.

According to my invention, however, each driving wheel has a motor connected thereto and under the control of the steering gear, so that, if the automobile is turned to the right or to the left, the circuit of the motor connected to the inside driving wheel will be broken.

The single figure of the accompanying drawing is a diagrammatic view of a control system embodying my invention.

Referring to the drawing, two driving wheels 1 and 2 are rigidly attached to an axle 3 which is divided into sections 4 and 5. Mounted upon the axle sections, so that the armatures rotate therewith, are two driving motors 6 and 7 which are controlled by a master controller 8 through a circuit comprising resistors 9, 10 and 11, a battery 12, and electrically operated switches 13 and 14. The switches 13 and 14 serve to close the circuits of motors 6 and 7 when their operating coils are deënergized and to break the circuits of the motors when their coils are energized.

The master controller 8 embodies two movable control segments 15 and 16 which coöperate with the contact fingers 17, 18, 19, 20 and 21.

The two electrically operated switches 13 and 14 are controlled by a steering gear 22 and a circuit that includes a battery 23. The steering gear comprises a steering wheel 24 which is attached to the shaft 25. On the shaft 25 is mounted a contact wheel 26 having insulated contact segments 27 and 28 spaced around its periphery to co-act with contact terminals 29 and 30.

In order to start the automobile, the master controller is moved to position $a$ to effect engagement between the movable contact segment 16 and the contact finger 18. Thus, a circuit is closed from one terminal of battery 12 through the resistors 9, 10 and 11, contact finger 18, control segment 16, in parallel, through the switches 13 and 14 and motors 6 and 7 to the other terminal of battery 12. The motors 6 and 7 are energized by a circuit including the resistors, and, in order to exclude the resistors from the motor circuit the controller is moved successively to positions $b$, $c$ and $d$.

If the steering wheel 24 is turned to the right or to the left, as indicated by the arrows, to control the direction of movement of the automobile, engagement will be made between the contact terminals 30 and the contact segment 28 or between the contact terminals 29 and the contact segment 27. If the steering wheel is turned to the left, a circuit is closed from one terminal of the battery 23 through the coil of switch 14, contact terminals 29, segment 27, controller segment 15, and contact finger 17 to the other terminal of battery 23. Thus, the switch 14 is operated to break the circuit of motor 6, which is connected to the inside driving wheel, if the automobile is turned to the left. Should the steering wheel be turned to the right, the circuit of the motor 7 will be broken in a similar manner by switch 13. The circuits for the coils of switches 13 and 14 pass through the controller 8 to prevent either of these circuits being closed when the automobile is stationary and the steering wheel is turned to the right or to the left.

Obviously, the circuit connections and apparatus of my invention may be varied considerably without departing from the spirit and scope of my invention, and I desire, therefore, that only such limitations shall be imposed as are indicated in the appended claims.

I claim as my invention:

1. In a control system for an automobile having two driving wheels, the combination with an axle, driving motors mounted on said axle, one for each of said wheels, of an independently operated master controller for governing the operation of said motors, a steering gear, and means controlled by said controller and said steering gear for permitting the operation of but one motor when turning to the right or to the left.

2. In an automobile having two driving wheels, the combination with two driving motors one connected to each of said driving wheels, a steering gear and automatic means controlled by said steering gear for preventing the operation of one of said motors when turning to the right or to the left, of a master controller for governing the operation of said motors and for preventing the operation of said automatic means until said controller has been moved to one of its operative positions.

3. In a control system for an automobile having two driving wheels and a steering gear, the combination with an axle for said driving wheels, and two motors connected respectively to said wheels and mounted on said axle, of a master controller for governing the operation of said motors, and means jointly controlled by said steering gear and the controller for breaking the circuit of the one or the other of said motors according to whether the steering gear is turned to the right or to the left.

4. In a control system for an automobile having two driving wheels, the combination with an axle for said wheels, and a driving motor for each of said wheels mounted on said axle, of a switch in each motor circuit controlled by said steering gear and adapted to break either motor circuit according to whether said steering gear is turned to the right or to the left, and a master controller for governing the operation of said motors and for controlling the circuit of said switches.

5. In a control system for an automobile, the combination with a steering gear, an axle divided into two sections, a driving wheel rigidly attached to each of said axle sections and adapted to rotate therewith, and a motor mounted on each axle section and adapted to rotate the same, of an electrically operated switch in each motor circuit controlled by said steering gear and adapted to break the circuit of the one or the other of said motors according to whether said steering gear is turned to the right or to the left, and a master controller for governing the operation of said motors and for controlling said switches.

6. In a control system for an automobile having two driving wheels, the combination with two motors respectively associated with said driving wheels, and a master controller for governing the acceleration of said motors, of a steering gear, an electrically operated switch located in each motor circuit between the motor and said controller and jointly controlled by the master controller and the steering gear for permitting the operation of only one motor when the car is operating on a curve.

In testimony whereof, I have hereunto subscribed my name this 26th day of Nov., 1915.

REESE T. KINTZING.